United States Patent [19]
Taniguchi et al.

[11] Patent Number: 5,245,785
[45] Date of Patent: Sep. 21, 1993

[54] MAT WITH SEED AND METHOD OF PRODUCING SAME

[75] Inventors: Mituo Taniguchi; Yasuhoshi Fuzishima, both of Tsuyama; Motonari Hanamaki; Masashi Shibata, both of Kume, all of Japan

[73] Assignee: Nisshoku Corporation, Okayama, Japan

[21] Appl. No.: 726,177

[22] Filed: Jul. 5, 1991

[30] Foreign Application Priority Data

Aug. 4, 1990 [JP] Japan ................... 2-207098
Dec. 13, 1990 [JP] Japan ................... 2-410636

[51] Int. Cl.⁵ .................................. A01C 1/04
[52] U.S. Cl. .................................. 47/56; 47/9
[58] Field of Search .................... 47/56, 9 S

[56] References Cited

U.S. PATENT DOCUMENTS

| | | | |
|---|---|---|---|
| 2,648,165 | 8/1953 | Nestor | 47/56 |
| 3,160,986 | 12/1964 | Watson et al. | 47/56 |
| 3,703,786 | 11/1972 | Swan | 47/56 |
| 3,812,618 | 5/1974 | Wood et al. | 47/56 |
| 3,949,145 | 4/1976 | Otey et al. | 47/79 |
| 4,007,556 | 2/1977 | Gluck et al. | 47/56 |
| 4,173,844 | 11/1979 | Knolle et al. | 47/56 |
| 4,357,780 | 11/1982 | Ball. | |

FOREIGN PATENT DOCUMENTS

| | | | |
|---|---|---|---|
| 1151427 | 8/1983 | Canada | 47/56 |
| 1926786 | 11/1970 | Fed. Rep. of Germany. | |
| 2048925 | of 1972 | Fed. Rep. of Germany | 47/56 |
| 2238416 | 2/1975 | France. | |
| 7802783 | 9/1979 | Netherlands | 47/56 |
| 997889 | 7/1965 | United Kingdom. | |

Primary Examiner—Carl D. Friedman
Assistant Examiner—Joanne C. Downs
Attorney, Agent, or Firm—Wenderoth, Lind & Ponack

[57] ABSTRACT

A mat with seed is produced by adhering turf seeds onto a nonwoven fabric. Water-soluble adhesives are prevented from being absorbed by the nonwoven fabric to ensure uniform turf surfaces of good appearance. The water-soluble nonwoven fabric is superior in dispersibility, and comprises long fibers having a reduced width and bound with a binder comprising a water-soluble resin and a very small quantity of water repellent reagent such that the long fibers are intertwined in one direction only by foams of water-soluble starch material having a diameter of 7 mm or less.

11 Claims, 2 Drawing Sheets

5,245,785

MAT WITH SEED AND METHOD OF PRODUCING SAME

BACKGROUND OF THE INVENTION

1. Field of the Invention

The present invention relates to a mat with seed and a method of producing a mat with seed.

2. Description of the Prior Art

In the growing of turf on a putting green, a tee ground, a fairway and the like on a golf course, and the development of turf surfaces on green park tracts of land, a riverbed and the like, turf seeds have been directly seeded by hand, sprayed, or raw turfs, such as Korai turfs, have been planted.

However, in engineering methods such as the direct seeding of the turf seeds by hand and the spraying of the seeds, disadvantages have occurred in that the seeding and spraying are apt to be unevenly carried out, and thus an unevenness is produced in the germinating condition of the turf, whereby it is difficult to form a uniform turf surface. The engineering method of planting raw turfs has not exhibited the above-described disadvantages, but a disadvantage has occurred in that the construction unit cost has increased.

Having turf seeds uniformly adhered to a nonwoven fabric by spraying a water-soluble starch material on to the turf seeds and dropping the turf seeds on one side of the dispersive nonwoven fabric has been considered. Roughly intertwined fibers and finely intertwined fibers are repeated lengthways and breadthways at suitable intervals to form a mat with seed, and then the mat with seed is planted on the surface of the ground.

However, in the above-described conventional mats with seed, the fibers of the nonwoven fabric are intertwined lengthways and breadthways, so that a problem has occurred in dispersibility. In addition, since foam bubbles of the water-soluble starch material are uneven in size, portions to which large drops of water-soluble starch material are adhered are insufficiently dried, and the dispersive nonwoven fabric absorbs water to be dispersed before the drying is completed. Thus it has been difficult to obtain the desired mat with seed.

Furthermore, in the case of a mat with seed for use on a golf course, it is important to uniformly adhere a small quantity of turf seed. But, in the method in which the water-soluble search material is sprayed on to the turf seeds and the turf seeds are dropped on the fabric, a problem has occurred in that it is difficult to control the quantity of seeds seeded. Thus the seeds are apt to be seeded in a striped pattern, and it is difficult to maintain uniformity.

The present invention has been achieved in view of the above-described problems of the prior art, and it is one object of the present invention to provide a useful mat with seed capable of uniformly germinating to form turf that looks good. It is another object of the present invention to provide a method of easily producing a mat with seed capable of securely and fixedly attaching turf seeds and the like to a nonwoven fabric.

SUMMARY OF THE INVENTION

In order to achieve the above described objects, the following measures are adopted in the present invention.

A first measure relates to a mat with seed. According to the first measure, turf seeds are adhered to a water-soluble nonwoven fabric superior in dispersibility and comprising long fibers having a reduced width bound with a binder so as to be intertwined in one direction by means of a foam with bubbles having a diameter of 7 mm or less of a water-soluble starch material.

A second measure relates to a method of producing the mat with seed. According to the second measure, the foam, the bubbles thereof having a diameter of 7 mm or less, of the water-soluble starch material is sprayed onto the water-soluble nonwoven fabric superior in dispersibility and comprising the long fibers having a reduced width bound with the binder so as to be intertwined in one direction. Then the turf seeds are seeded on the nonwoven fabric by a seeder, followed by sprinkling the foam, the bubbles thereof having a diameter of 7 mm or less of the water-soluble starch material onto the seeded turf seeds.

In every measure described above, it is preferable that the binder comprises a water-soluble resin and a very small quantity of water-repellent reagent. In addition, it is preferable that 80% or more of the foam bubbles has a diameter within a range of 2 to 5 mm.

Since the fibers of the nonwoven fabric are intertwined only in one direction, the nonwoven fabric is superior in dispersibility, i.e. the fibers have a superior tendency to separate from each other. Furthermore, since the nonwoven fabric is composed of long fibers, the turf seeds can be prevented from being moved even though they are dispersed by water, and thus the turf seeds on the nonwoven fabric can be effectively prevented from being biased. And, where the binder of the nonwoven fabric is made of a mixture of the water-soluble resin and a very small quantity of the water repellent reagent, the nonwoven fabric has a suitable repellency.

That is to say, the water-soluble starch material for adhering the turf seeds to the nonwoven fabric is composed of a foam with bubbles having a diameter of 7 mm or less and the nonwoven fabric has a suitable repellency, so that, even though the water-soluble starch material is sprinkled onto the nonwoven fabric before the turf seeds are seeded, the water-soluble starch material is not absorbed by the nonwoven fabric for about 5 minutes, e.g. Accordingly, upon sprinkling the water-soluble starch material, and then the turf seeds onto the nonwoven fabric, followed by again sprinkling the water-soluble starch material, the water-soluble starch material is speedily dried without being absorbed by the nonwoven fabric, whereby the turf seeds are securely adhered to and seeded on the nonwoven fabric.

With this mat with seed, the turf seeds are not separated from the nonwoven fabric during handling such as transportation. Accordingly, when the turf seeds are grown, a uniform turf surface can be formed by laying the mat with seed on an object surface.

DETAILED DESCRIPTION OF THE PREFERRED EMBODIMENT

The preferred embodiment of the present invention will be described below with reference to the drawings.

Figure 1:
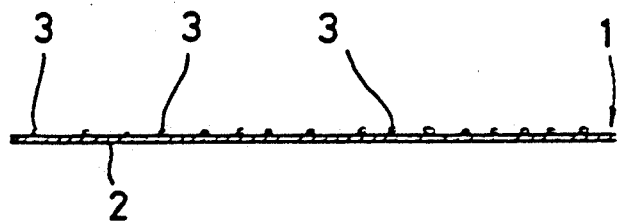
FIG. 1 is a sectional view showing one example of a mat with seed according to the present invention.
Figure 3:
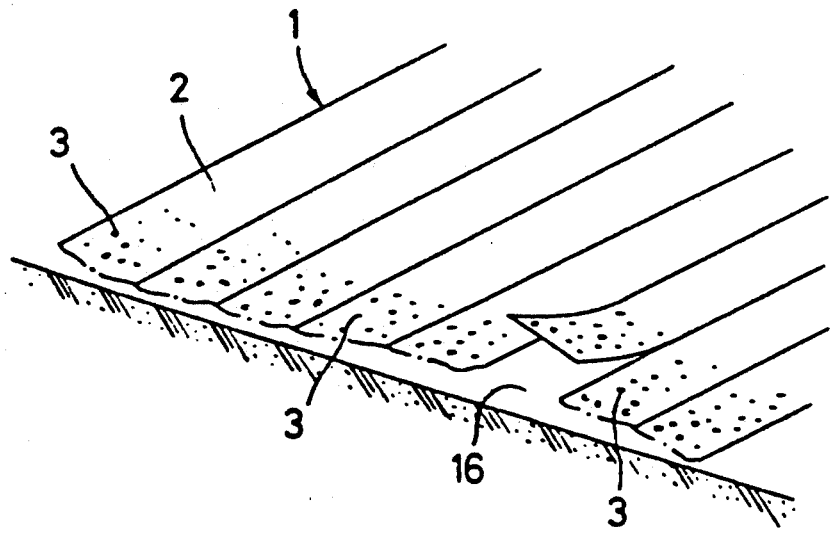
FIG. 3 is a diagram showing a condition of the mat with seed as laid.
Figure 2:
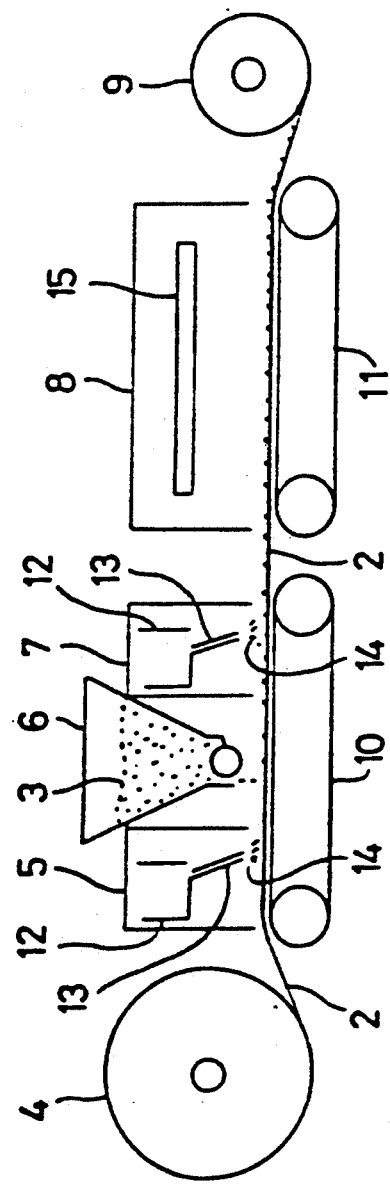
FIG. 2 is a diagram showing a manufacturing process of the mat with seed of FIG. 1.

FIGS. 1 to 3 show one preferred embodiment of the present invention. Referring to FIG. 1, reference numeral 1 designates a mat with seed, reference numeral 2 designates a nonwoven fabric, and reference numeral 3 designates turf seeds seeded on one side of the nonwoven fabric 2 and adhered thereto by a water-soluble starch material, which is thus a water-soluble adhesive.

The mat with seed 1 is produced by the use of an apparatus as shown in FIG. 2. Referring to FIG. 2, reference numeral 4 designates a nonwoven fabric roll, reference numeral 5 designates a first starch material sprayer, reference numeral 6 designates a seeder, reference numeral 7 designates a second starch material sprayer, reference numeral 8 designates a drier, reference numeral 9 designates a winding roll, and reference numerals 10 and 11 designate a conveyor.

A water-soluble nonwoven fabric that is superior in dispersibility, and which comprises long fibers having a small width, bound so as to be intertwined in one direction, is preferably used as to nonwoven fabric 2 of the nonwoven fabric roll 4. Fibers of, for example, 1.5 deniers and 51 mm long are bound by the use of a binder made of a mixture of a water-soluble resin, such as polyvinyl alcohol (hereinafter referred to as PVA), having a low polymerization degree and a very small quantity of a water repellent reagent so that a ratio percentage of the fibers to the water-soluble starch material may be 80:20 by percentages and the weight per unit area may amount to about 23 g/m$^2$. The nonwoven fabric roll 4 has a width of about 1,050 mm and a length of about 1,050 mm. In addition, various kinds of water repellent reagents, such as those of the silicone family, fluorine family and the wax family, are mixed in PVA in a quantity of 1 to 4%, preferably 3%. Where the mixture of the water-soluble resin and a very small quantity of the water repellent reagent is used as the binder, the turf seeds 3 can be securely adhered to the nonwoven fabric 2, and thus the turf seeds 3 can be satisfactorily prevented from falling from the nonwoven fabric 2. By the way, comparing the case where the binder with the water repellent reagent mixed therein was used with the case where a binder without a water repellent reagent was used, the number of turf seeds that fall off during transportation of the mat with seed in the former case was about 1/5 of the number in the latter case.

The first starch material sprayer 5 and the second starch material sprayer 7 have the same known construction, and comprise, for example, a starch material-housing tank 12 and a nozzle 13, so that the nonwoven fabric 2 rewound from the nonwoven fabric roll 4 and the nonwoven fabric 2 with the turf seeds 3 seeded may be supplied with a water-soluble starch material 14.

It is desirable that foams of the water-soluble starch material 14 are adjusted so that the bubbles have diameters of 7 mm or less. It is more advantageous that 80% or more of the bubbles have diameters within a range of 2 to 5 mm. For example, a mixture of water, PVA and a vinyl acetate emulsion as a film-reinforcing reagent can be used as the water-soluble starch material 14.

The seeder 6 is disposed between the first starch material sprayer 5 and the second starch material sprayer 7. A seeder having a known construction can be used as the seeder 6. As to the quantity of turf seeds 3 seeded by the seeder 6, pencross is, for example singly seeded in a quantity of 8 g/m$^2$ in the case of, for example, a mat with seed 1 for use on the green on a golf course. In order to make uniform seeding easy, the turf seeds 3 comprising pencross bentgrasses and fillers, such as vermulite (expanded vermiculite), may as needed be seeded in a quantity of 20 g/m$^2$. In addition, turf seeds 3 with short crown species, such as tall fescue, perennial ryegrass and Kentucky blue grass, suitable for sportsturf, are seeded in a quantity of 55 g/m$^2$ for the mat with seed for use on tee grounds and fairways on golf courses, or the development of a turf surface on green tracts of land in parks, a riverbed and the like. Furthermore, a water-holding material may be suitably added to the above described turf seeds 3.

The drier 8 is provided with, for example, a hot air source 15 using propane gas so that the nonwoven fabric 2 may be uniformly dried over the entire width thereof.

The procedures of producing the mat with seed 1 for use in, for example, the green on a golf course with the apparatus having the above-described construction will be described below. The nonwoven fabric roll 4 is rotated in a direction to feed the nonwoven fabric 2 toward the first starch material sprayer 5, from which the water-soluble starch material 14 is uniformly sprayed and sprinkled at a spraying pressure of about 6 kg/cm$^2$ onto the nonwoven fabric 2 sent out from the nonwoven fabric roll 4.

Since the foam bubbles of the water-soluble starch material 14 are adjusted so as to have diameters of 7 mm or less, and so that 80% or more of them may have diameters within a range of 2 to 5 mm, and since additionally the nonwoven fabric 2 has a moderate repellency, the water-soluble starch material 14 sprayed onto the nonwoven fabric 2 prior to the sprinkling of the turf seeds 3 is not absorbed by the nonwoven fabric 2 for about five minutes. The nonwoven fabric 2 with the water-soluble starch material 14 sprayed thereonto is conveyed to the seeder 6 by means of the conveyor 10, where the nonwoven fabric 2 is supplied with the turf seeds 3 comprising pencross and fillers as needed. It is preferable to uniformly seed the turf seeds 3 in a quantity of 8 g/m$^2$.

The nonwoven fabric 2 with the turf seeds 3 seeded thereon is sent to the second starch material sprayer 7 by means of the conveyor 10, where the water-soluble starch material 14 is again sprayed and sprinkled onto the nonwoven fabric 2. The spraying conditions are the same as those with the first starch material sprayer 5.

The reason why the water-soluble starch material 14 is not immediately absorbed by the nonwoven fabric 2, even though the water-soluble starch material 14 is sprayed both before and after the sprinkling of the turf seeds 2 onto the nonwoven fabric 2, as described above, is as follows. The nonwoven fabric 2 has the previously noted suitable repellency, so that, even though the water-soluble starch material 14 is sprayed onto the nonwoven fabric 3 prior to the sprinkling of the turf seeds 3, the water-soluble starch material 14 is not absorbed by the nonwoven fabric 2 for about five minutes. And, upon sprinkling the turf seeds 3 and subsequently again spraying the foam bubbles of the water-soluble starch material 14, the sprayed water-soluble starch material 14 is speedily dried before it is absorbed by the nonwoven fabric 2. The turf seeds 3 are thereby securely adhered to and seeded on the nonwoven fabric 2.

The nonwoven fabric 2, onto which the water-soluble starch material 14 has been sprayed by means of the second starch material sprayer 7, is sent by means of the conveyors 10 and 11 to the drier 8, where drying is carried out. The turf seeds 3 are uniformly adhered to and seeded on one side of the nonwoven fabric 2 to obtain the desired mat with seed. The obtained mat with seed is wound by means of the winding roll 9 to obtain a roll mat with seed. The obtained roll mat with seed is cut in a suitable length to obtain the mat with seed 1 for use on a green on a golf course.

In the use of the mat with seed 1 on-site, the mat with seed 1 is laid over all of the surface 16 of the ground, where trees are to be planted, on the site, and then a fill of about 0.5 cm thick is made. Subsequently, water is sprinkled onto the mat with seed 1 to bring the nonwoven fabric 2 into a wet condition, whereby the fibers are dispersed and rough portions of the fibers are cut by waterdrops to be made more rough, and thus spaces are formed among the fibers. On the other hand, as soon as the turf seeds 3 seeded on the nonwoven fabric 2 meet with water, the germinating action starts and germs are budded through the spaces among the fibers. The nonwoven fabric 2 is composed of long fibers, so that, even though they are dispersed by water, the turf seeds 3 can be prevented from moving, and thus the turf seeds 3 on the nonwoven fabric 2 can be prevented from being biased. Accordingly, a uniform condition of the germs on the nonwoven fabric 2 can be maintained. Subsequently, a uniform turf surface can be formed by suitably giving water, fertilizers and the like.

In addition, fertilizers, water-holding materials and the like may be adhered to the nonwoven fabric 2 at the same time as when the turf seeds 3 are adhered to the nonwoven fabric 2.

According to the present invention, the fibers of the nonwoven fabric for fixing the turf seeds are intertwined only in one direction so that the dispersibility is improved, and moreover, the nonwoven fabric is composed of long fibers, so that even though the fibers are dispersed by water, the turf seeds can be prevented from moving and the turf seeds of the nonwoven fabric can be effectively prevented from being biased. In particular, in the case where the mixture of the water-soluble resin and a very small quantity of water repellent reagent is used as the binder, the turf seeds can be prevented from falling from the nonwoven fabric during transportation and the like. Accordingly, a uniform turf surface of a good appearance can be easily formed, and thus a great contribution to the planting of trees on the surface of the earth can be achieved.

What is claimed is:

1. A mat with seed, comprising a plurality of turf seeds adhered to a water-soluble nonwoven fabric having good dispersibility, said nonwoven fabric comprising long fibers having a small width that are bound with a binder so as to be intertwined in one direction only, said plurality of turf seeds being adhered to said nonwoven fabric with a water-soluble adhesive.

2. The mat with seed of claim 1, wherein said binder comprises a water-soluble resin and a water repellent reagent, and said water-soluble adhesive is applied as a foam having bubbles of a diameter of 7 mm or less.

3. The mat with seed of claim 2, wherein said water-soluble resin is polyvinyl alcohol.

4. The mat with seed of claim 3, wherein said water repellent reagent is in a quantity of 1 to 4% of the quantity of said water-soluble resin.

5. The mat with seed of claim 2, wherein said water repellent reagent is in a quantity of 1 to 4% of the quantity of said water-soluble resin.

6. The mat with seed of claim 2, wherein 80% of said bubbles are of a diameter within a range of 2 to 5 mm.

7. The mat with seed of claim 1, wherein said long fibers having a small width are 51 mm long and 1.5 deniers.

8. A method of producing a mat with seed, comprising the steps of:
providing a water-soluble nonwoven fabric having good dispersibility, said fabric comprising long fibers having a small width that are bound with a binder so as to be intertwined in one direction only;
spraying a water-soluble adhesive in a foam having bubbles of a diameter of 7 mm or less onto said nonwoven fabric;
seeding turf seeds on said nonwoven fabric; and
spraying said water-soluble adhesive in a foam having bubbles of a diameter of 7 mm or less onto said turf seeds on said non-woven fabric.

9. The method of claim 8, wherein said binder comprises a water-soluble resin and a water repellent reagent.

10. The method of claim 9, wherein said water-soluble resin is polyvinyl alcohol.

11. The method of claim 10, wherein said water repellent reagent is in a quantity of 1 to 4% of the quantity of said water-soluble resin.

* * * * *